United States Patent [19]

Ghahary

[11] Patent Number: 5,304,592
[45] Date of Patent: Apr. 19, 1994

[54] MINERAL-LIKE PLASTICS

[76] Inventor: Akbar Ghahary, 64 Ricker Dr., Ringwood, N.J. 07456

[21] Appl. No.: 882,839

[22] Filed: May 14, 1992

Related U.S. Application Data

[63] Continuation-in-part of Ser. No. 788,982, Nov. 7, 1991.

[51] Int. Cl.$^5$ .............. C08K 3/10; C08G 63/48; C08G 63/91
[52] U.S. Cl. ................. 524/437; 524/436; 524/448; 524/445; 524/492; 524/494; 524/405; 524/425; 524/560; 524/13; 525/43; 525/64; 525/169; 525/170; 525/171
[58] Field of Search .............. 524/437, 560, 445, 494, 524/429, 13, 448, 405, 436, 492, 425; 525/43, 64, 169, 170, 171; 523/201; 428/407

[56] References Cited

U.S. PATENT DOCUMENTS

| | | | |
|---|---|---|---|
| 4,085,246 | 4/1978 | Buser et al. | 524/437 |
| 5,043,377 | 8/1991 | Nogi et al. | 524/437 |

FOREIGN PATENT DOCUMENTS

| | | | |
|---|---|---|---|
| 2197457 | 9/1987 | Japan | 524/437 |
| 8901504 | 2/1989 | World Int. Prop. O. | 524/437 |

*Primary Examiner*—Paul R. Michl
*Assistant Examiner*—LaVonda DeWitt
*Attorney, Agent, or Firm*—Lieberman & Nowak

[57] ABSTRACT

Granite-like plastics useful in all forms of molding and thermoforming are disclosed. The granite-like plastics include a multiplicity of particulates formed of a thermoplastic and thermoset plastic combination which are suspended within a clear or translucent matrix of the same thermoplastic material as the particulates. The particulates are maintained in suspension due to their isopynic density with the matrix. Of particular importance are granite-like acrylics that can be used in place of standard acrylics.

13 Claims, No Drawings

MINERAL-LIKE PLASTICS

BACKGROUND OF THE INVENTION

The subject application is a continuation-in-part of U.S. Ser. No. 788,982, filed Nov. 7, 1991, the contents of which are hereby incorporated by reference.

The subject invention relates generally to a method of forming a synthetic material which simulates natural substances such as stone and the like, and more particularly, to a method of preparing and manufacturing a synthetic plastic material capable of being formed into utile shapes. Of great importance are embodiments of the subject invention utilizing acrylics that may be formed to complement the coatings described in the parent application.

There currently exists a great need for synthetic materials which mimic the appearance of natural stone, and in particular granite. Such materials are commonly used in the manufacture of flooring, tiles, counter tops, sinks, architectural accoutrements, ornamental objects, and for other purposes for which natural materials are used.

Today's acrylics are commonly available in clear or solid colors, although several marbleized varieties are now on the market. Although the subject invention is primarily directed to acrylic compositions, it may be utilized in any application where a thermoplastic material is required. Such applications include, but are not limited to thermoforming, injection molding, blow molding, extrusion, etc.

The subject acrylics may be used in any application served by conventional acrylics. Such applications include, but not limited to, situations requiring low electrical conductivity, good arc resistance and dielectric strength, and the ability to resist alkali, non-oxidizing acids, aliphatic hydrocarbons, saltwater, photographic and battery solutions, and a wide variety of commercial products and food stuffs. In particular, these acrylics go hand-in-hand with the plastics detailed in the parent application to span the spectrum of applications for granite-like plastics.

The prior art is replete with attempts at producing a synthetic material which is natural is appearance. One such product is that described by Ross, et al., U.S. Pat. No. 4,433,070, issued Feb. 21, 1984 (reexamination certificate issued Feb. 10, 1987). Ross, et al. teach cultured onyx, cultured marble and like mineral-mimicking products. These products are formed from a discontinuous phase comprising a synthetic organic resin portion hardened to a predetermined hardness and a visually distinguishable continuous phase comprising a synthetic organic resin portion separately hardened to a predetermined hardness. The discontinuous phase is intimately distributed to form a marble-like appearance. Since the appearance of onyx and marble is swirled as opposed to suspended, as with granite, Ross, et al. did not have to address the problem of evenly suspending particles within a matrix. Accordingly, Ross, et al. do not teach or suggest creating particulates having the same relative density as the liquid matrix in which they are suspended. Moreover, since the Ross, et al. invention deals only with molded thermoset plastic products, as opposed to thermoformed products, it is not necessary for the product to have two phases with similar physical characteristics (except for that of hardness). Lastly, since onyx has a translucent striation and veining, the blurring of the matrix by the dissolution of the first hardened resin is not critical.

Baskin, U.S. Pat. No. 5,055,327, issued Oct. 8, 1991, teaches a cast simulated-stone containing flattened globules of overfilled, cured resin. The flattened globules substitute for natural stone chip additives and are formed by mixing a filler with a catalyzed liquid resin composition. Since the Baskin invention relates to compacting globules within a translucent matrix layer, Baskin did not have to address the problem of the globules coming out of suspension and does not teach or suggest utilizing particulates having the same relative density as the liquid matrix.

Buser, et al., U.S. Pat. Nos. 4,085,246 and 4,159,307, issued Apr. 18, 1978 and Jun. 26, 1979, respectively, describe a simulated granite and methods for its preparation. Buser, et al. use an acrylic polymer and at least one microscopic filler which surrounds a multiplicity of macroscopic opaque particles. Although Buser, et al. address the problem of preventing particles from settling too quickly in the liquid matrix, they do not teach or suggest the use of a thermoset and thermoplastic material to form particulates.

The subject simulated mineral has physical characteristics which enable it to be used both in a pelletized form (i.e., in all thermoplastic applications), while at the same time being suitable for thermoforming. Accordingly, the subject compositions and methods represent an advance in multicolor plastic technology.

SUMMARY OF THE INVENTION

The subject invention provides a simulated mineral article which comprises a plastic material suspended within a thermoplastic matrix. The plastic material and the thermoplastic matrix are visually distinguishable.

The subject invention also provides a method of preparing a simulated mineral article which entails preparing a liquid thermoplastic to serve as a matrix and then suspending a plastic material therein. Preferably, the plastic material is a multiplicity of solid particulates formed by combining the same thermoplastic as the matrix with a thermoset plastic to produce particulates having the same specific gravity as the liquid thermoplastic material.

DETAILED DESCRIPTION OF THE INVENTION

This section details various preferred embodiments of the subject invention. These embodiments are set forth to illustrate the subject invention, but are not to be construed as limiting. A broad array of plastic compositions suitable for use in forming simulated mineral articles and methods of manufacture are described. Common to each of these plastic materials is the suspension of a plastic material within a thermoplastic matrix.

As used throughout the application, the term thermoplastics has the generally accepted meaning in the art and includes, but is not limited to, ABS (polymers produced by polymerizing acrylonitrile, butadiene and styrene), ACS (polymers of polymerized acrylonitrile, chlorinated polyethylene and styrene), olefin-modified styrene-acrylonitrile, acetal homopolymer, acetal copolymer, ionomers, nitrile resins, phenylene-based resins, polyamine-imide, modified polyphenylene ether, polybutylene, polycarbonate, aromatic polyester, thermoplastic polyester (e.g., polybutylene terephthalate, polytetramethylene terephthalate or polyethylene terephtlalate), polypropylene, polyetheretherketone, polyetherimide, ethylene acid copolymer, ethylene-ethyl acrylate, ethylene-methyl acrylate, ethylene-vinyl acetate, polyimide, polymethylpentene, polyphenylene sulfide, nylon, acrylic, polyethylene, etc. and combinations thereof. Thermoset plastics are plastics requiring a chemical additive to cause a state conversion of the plastic from liquid to solid. Such thermoset plastics include, but are not limited to, allyl esters, aminoresins, furan polymers, phenolic resins, unsaturated alkyd polyester, unsaturated polyester, epoxies and melamine.

Since this patent application is not a primer on forming and handling of plastics, basic concepts known to those skilled in the art have not been set forth in detail. Concepts such as choosing a proper solvent or amount are readily determinable by those skilled in the art. Attention is directed to Modern Plastics Encyclopedia which is published annually by McGraw-Hill Inc. in which temperatures, choice of solvents, curing agents, etc. are set forth in detail. The text of Modern Plastics Encyclopedia, all volumes, is herein incorporated by reference.

The subject synthetic minerals typically use two resins which are mixed. For convenience, these resins are at times identified as Resin A and Resin B.

To form pellets or granules suitable for use in thermoplastic applications, Resin A (a thermoplastic material capable of being melted in plastic manufacturing machinery, such as in injection molding, extrusion, blow molding, compression molding, rotational molding, etc.) is mixed with Resin B (a thermoplastic and/or thermoset plastic having the same density and specific gravity as Resin A). To achieve a mineral-like appearance, Resin A and Resin B should be of contrasting colors or shades and, at the time of mixing, Resin A should be a liquid (not yet polymerized, or alternatively, melted).

Resin A and Resin B should have substantially identical or very similar physical properties, but Resin B either should have a higher melting point or should comprise a thermoset plastic. For example, if the melting point of Resin A is 600° F., Resin B should have a melting point of 700° F. or higher. Resin A will melt before Resin B, but Resin B will soften to facilitate processing and flow through injection nozzles. Because solid Resin B has the same specific gravity as liquid Resin A, Resin B remains in suspension. Melted (liquid) Resin A and unmelted (softened solid) Resin B can then be transferred to a mold cavity thus producing a granite-like effect. To ensure uniform dispersion, Resin B and Resin A should be combined within each pellet or granule. Pelletization facilitates production and processing in various manufacturing techniques, e.g., injection molding, compression molding and rotational molding.

To form a marbleized article, Resin A (a thermoplastic) is mixed with Resin B (a pigmented composite of the same thermoplastic as Resin A, but having a density and specific gravity different from that of Resin A).

Resin B (in particulate form) is mixed into liquid Resin A, and then introduced to thermoplastic processing equipment in a predetermined ratio dictated by design requirements.

To illustrate the subject invention, the use of acrylics will now be highlighted. Acrylics have the advantage of being useable in various types of molding, as well as in thermoforming. Moreover, acrylics are particularly suited to production of translucent materials for use in lighting fixtures or sign manufacturing, which complement the coatings described in the parent patent application.

The subject invention expands the spectrum of color variations for acrylics and represents an augmentation in the scope of applications for which acrylic is useful, especially with respect to mimicking polychromatic minerals. As used herein, acrylics comprise a broad array of polymers and copolymers belonging to the acrylate and methacrylate families of esters. These may be used singularly or in combination, as well as with functionally substituted derivatives or other monomers to give products ranging from soft, flexible elastomers to hard, stiff plastics and thermosets, and from highly polar to oleophilic resins.

Although the alkyl groups of the acrylic monomers may range from 1–18 carbon atoms, they are preferably from 1–4 carbon atoms in length. Suitable acrylic monomers include, but are not limited to, methyl and ethyl acrylates and methacrylates, n-propyl and i-propyl acrylates and methacrylates; n-butyl, 2-butyl, i-butyl, t-butyl acrylates and methacrylates; 2-ethylhexyl acrylate and methacrylate; cyclohexyl acrylate and methacrylate; ω-hydroxyalkyl acrylates and methacrylates; N-(t-butyl)aminoethyl acrylate and methacrylate; etc. Unsaturated monomers useful in the subject invention include bis-(β-chloroethyl) vinylphosphonate; styrene; vinyl acetate; acrylonitrile; methacrylonitrile; acrylic and methacrylic acids; 2-vinyl-and 4-vinylpyridines; maleic acid; maleic anhydride and esters of maleic acid; acryl amide and methacrylamide; itaconic acid, itaconic anhydride and esters of itaconic acid and multifunctional monomers for cross linking purposes such as unsaturated polyesters; alkylene diacrylates and dimethacrylates; allylacrylate and methacrylate; N-hydroxymethylacrylamide and N-hydroxymethylmethacrylamide; N,N'-methylene diacrylamide and dimethacrylamide; glycidyl acrylate and methacrylate; diallyl phthalate; divinylbenzene; divinyltoluene; trimethanolpropane triacrylate acrylate and trimethacrylate; pentaerythritol tetraacrylate and tetramethacrylate; triallylcitrate and triallylcyanurate.

Of particular concern to the subject invention, is the family of hard plastics derived from methyl methacrylate. It is to be understood that the subject acrylics may be produced in any form known to those skilled in the art. Typically, however, these acrylics will be sold as molding pellets or sheets. Pellets can be molded or extruded in conventional equipment capable of delivering melt to the nozzle at high pressure (typically greater than 10,000 p.s.i.).

To obtain a granite-like cast acrylic, Resin A (an acrylic) is mixed with a Resin B (a particulate made of a thermoset and/or thermoplastic material that cannot be dissolved by the solvent present in Resin A). Resin A is preferably clear or translucent, although it may approach opaque. Resin B is preferably cured and ground to different sizes to aid in suspension and the creation of a three-dimensional look, the sizes and shapes of the grind being determined by design requirements.

Although it might appear simple to suspend solid particulates (Resin B) within a matrix, the chemical properties of thermoplastics create many problems. To suspend particulates within a matrix, the subject invention utilizes particulates which have the same specific gravity as the liquid matrix. Once the particulates are suspended, there is no gravitational reason for them to precipitate or levitate out of solution.

Resin B particulates must have the same (isopynic) specific gravity and density as that of Resin A in the melted or liquid form. To achieve this, the specific gravity of Resin A must be measured. Adjustments can then be made in the formulation of Resin B by varying the amount of solvent added to the solid before crosslinking and/or by adding low or high weight filler to Resin B. Pigment should also be added to Resin B to distinguish it from Resin A.

Such materials are typically ground to a fine mesh. Preferably, this ground material is not lower than 100 U.S. mesh and not higher than 14 U.S. mesh since particles this size can pass through injection nozzles and gate without clogging.

Granite-like particulates may also be mixed within an extrusion machine using a conventional clear acrylic. In such applications, a mixture of from about 50% to about 98% by weight clear acrylic is mixed with from about 2% to about 50% by weight particulates. However, in the preferred commercially envisioned extrusion applications, the clear thermoplastic and the particulates will be premixed and sold as pellets. In cell casting applications, particulates (typically 1-50% by weight) will be sold as an additive filler to be added to liquid methyl methacryate.

Fillers useful in the subject invention include, but are not limited to, alumina trihydrate (ATH), powdered quartz, powdered glass, silica, powdered calcium carbonate, wood flour, diatomacious earth, gypsum, clay minerals such as china clay, illite, montmorillonite, bentonite and pyrophyllite, powdered chalk, marble and limestone, aluminum stearate, mullite, calcium silicate, anhydrite, boracite and borax. One filler which has been found to be particularly useful is miniature glass bubbles (spheres). These small glass bubbles have a low relative density by virtue of the air trapped within and are readily introduced into a molten plastic composition. Other desirable fillers include ATH which has a desired density as well as fire retardancy and fumed silica which has a relatively low density.

The second problem overcome by the subject invention is that of the liquid matrix (Resin A) dissolving the particulates (Resin B), thus leading to a clouded and blurred matrix. The subject invention overcomes this problem by employing a thermoplastic and/or thermoset plastic to form the particulates. The combination of a thermoplastic and a thermoset plastic has been found particularly useful since it overcomes non-uniform molding characteristics obtained when using mixed particulates and matrix (i.e., when the matrix and the particulates are formed of different plastics).

By utilizing a particulate which comprises a thermoplastic identical to that of the matrix, the solidifed combination of matrix and particulates, acts as a single plastic material. This allows the subject acrylics to be manufactured in pelletized form since entrapped particulates will not come out of suspension during heating. Moreover, this renders the granite-like plastic suitable for all applications currently involving a single plastic.

For example, if a matrix is to have a dynamic viscosity of 4,000 centipoise, then the particulates must have an equivalent specific gravity. The dynamic viscosity of the matrix and the specific gravity of the particulates are readily determinable by one skilled in the art. As is well known, a balance must be maintained to minimize trapped air and shrinkage of the plastic. A low viscosity plastic will tend to shrink due to the high solvent content, whereas a high viscosity plastic will tend to have problems with included air.

One suitable acrylic consists of:

| | |
|---|---|
| Resin B particulates | 2-50% by weight |
| Methyl methylacrylate monomer | 50-98% by weight |

Although this is a preferred composition, variations due to the inclusion of additional constituents are acceptable.

In an application of the subject invention suitable for injection molding, blow molding, extrusion, etc., pellets with granite-like qualities are formed.

The following formulation is particularly effective for use in forming pellets for plastic processing machinery:

| | |
|---|---|
| Resin B particulates | 2-50% by weight |
| Resin A (any thermoplastic) | 50-98% by weight |

Upon reading the subject application, various alternative embodiments will become obvious to those skilled in the art. These alternative embodiments are to be considered within the scope and spirit of the subject invention. The subject invention is only to be limited by the claims which follow and their equivalents.

What is claimed is:

1. A simulated mineral article which comprises a plastic material suspended within a thermoplastic matrix, the plastic material and the thermoplastic matrix being visually differentiatable, substantially immiscible and substantially isopycnic in density, the plastic material comprising both a thermoplastic and a thermoset plastic, the thermoplastic matrix consisting essentially of a thermoplastic.

2. An article of claim 1, wherein the specific gravity of the plastic material is adjusted by the addition of fillers.

3. An article of claim 2, wherein the filler is selected from the group consisting of alumina trihydrate, clay, glass, silica, calcium carbonate, wood flour, diatomaceous earth, gypsum, chalk, marble, limestone, aluminum stearate, mullite, calcium silicate, and hydrite, boracite and borax.

4. An article of claim 3, wherein the filler is alumina trihydrate.

5. An article of claim 3, wherein the filler is glass.

6. An article of claim 5, wherein the glass is formed as miniature spheres.

7. An article of claim 3, wherein the filler is silica.

8. An article of claim 7, wherein the silica is fumed silica.

9. An article of claim 1, wherein the plastic material further comprises a pigment.

10. An article of claim 1, wherein the thermoplastic matrix comprises a pigment.

11. A method of preparing a simulated mineral article, which comprises:
    (a) preparing a liquid thermoplastic matrix consisting essentially of a thermoplastic; and
    (b) suspending a plastic material within the liquid thermoplastic matrix, the plastic material having been formed by mixing a thermoplastic with a thermoset plastic so that the plastic material has the same specific gravity as the liquid thermoplastic matrix.

12. A method of claim 11, wherein the thermoplastic matrix comprises from about 50% to about 98% by weight of the article.

13. A method of claim 11, where the plastic material comprises from about 2% to about 98% by weight of the article.

* * * * *